Patented Sept. 17, 1935

2,014,559

UNITED STATES PATENT OFFICE 2,014,559

PREPARATION OF IRON HAVING IMPROVED CHARACTERISTICS

Edwin L. Crosby and Albert E. Rhoads, Detroit, Mich., assignors to Detroit Electric Furnace Company, Detroit, Mich., a corporation of Michigan No Drawing. Application June 27, 1932, Serial No. 619,530

2 Claims. (Cl. 148—3)

This invention relates to the preparation of white iron having valuable inherent characteristics not found in white iron produced according to heretofore known methods.

More specifically, this invention relates to the production of a superior type of white iron by a superheat treatment under reducing conditions in a rocking type electric furnace.

In our U. S. Patent No. 1,886,873, dated Nov. 8, 1932, is disclosed a method of preparing gray cast iron of improved characteristics by superheating a white iron melt at temperatures from 2800° to 3100° F., while simultaneously agitating the molten mass until all of the carbon present is dissolved in the iron and graphitizing the mass to form gray iron.

We have now found that by superheating a white iron melt with simultaneous agitation under reducing conditions in a rocking type of indirect electric arc furnace until the carbon is dissolved, we can prepare white iron castings having inherent characteristics making the iron valuable for the production of superior grades of malleable iron and short anneal iron of high malleability. Heretofore, short anneal processes have not been satisfactory because malleable castings of ordinary white iron composition do not respond to a satisfactory degree of graphitization in a short time. As a result, a short anneal iron, as heretofore produced, was in reality only partially annealed. Complete graphitization of the carbides did not occur. By our process, however, it is possible to thoroughly anneal the novel white iron prepared with a three-hour heat treatment.

It is essential that reducing conditions be maintained in the preparation of the white iron by taking special precaution to keep the molten mass in the electric furnace out of contact with the air. By our method of superheating and agitating a white iron melt in a reducing atmosphere, such as that produced by an indirect arc in a closed furnace, the carbides (Fe$_3$C) present in the melt are well dispersed when the white iron is cast. Any oxides or sulphides present in the melt are also uniformly distributed by the agitating treatment. According to some authorities, these oxides and sulphides act as nuclei for the formation of graphite nodules in the annealing treatment. Since these nodules are well dispersed throughout the mass, a superior type of annealed iron results with only a short heat treatment.

The agitation treatment in a rocking type furnace, such as is used in our process, being of a mechanical nature is independent of the heating power input to the furnace. Because of this, the agitation, mixing, or mechanical rocking of the furnace can be controlled and varied independently of the heating power input to the furnace. This is not possible in high frequency induction furnaces where any disturbance of the metal bath depends directly upon the electric heating power supplied to the furnace.

Furthermore, the agitation treatment, combined with the superheat treatment under reducing conditions serves to saturate the white iron melt with the maximum volume of CO and $CO_2$ that it can hold in solution. According to some authorities these gases act as catalysts in the annealing of iron. Therefore, the large amount of these gases held in the melt greatly speeds up the annealing treatment if the iron is to be later annealed.

It is therefore an object of this invention to provide a process of preparing white iron having valuable inherent characteristics adapting it to be highly annealed in a short time to produce a short annealed iron and also being readily adapted to produce a superior type of cast iron.

It is another object of this invention to provide a process of producing a superior type of white iron having valuable inherent characteristics.

A specific object of this invention is to prepare an iron in which the carbon is thoroughly dissolved and being substantially free from oxides.

The specific object of this invention is to provide a process comprising the simultaneous superheating and agitating treatment under reducing conditions of a white iron melt to produce a superior type of white iron.

Other and further objects of this invention will become apparent from the description and appended claims.

Some of the inherent valuable characteristics of the white iron produced by our process are clearly disclosed when the iron is used to prepare malleable iron by anneal treatments. The manufacture of malleable cast iron may be divided into two steps, first, the production of white iron castings, and second, the heat treatment of the white iron castings to liberate combined carbon therein.

In white iron castings, all of the carbon is combined in the form of carbides such as iron carbides (Fe$_3$C) known as Cementite. Some of this Cementite is in the free state and some of it is in solid solution, as Martensite, Troostite or Austenite. The heat or anneal treatment to produce a malleable iron liberates the combined carbon as graphite and causes the graphite to occur in nodules in a matrix of Ferrite.

The anneal treatment itself, occurs in two stages. The first stage consists in bringing the material to a temperature in excess of the critical point for a sufficient time so that the free carbides are decomposed. During this stage all of the free Cementite, as well as the Martensite, Troostite or Austenite are decomposed, and Pearlite results to a large extent.

During the second stage of the anneal, an eutectoid Cementite, which is present in the Pearlite, is decomposed. The carbon or graphite liberated migrates to particles of graphite liberated in the first stage, eventually producing a ferritic mass having dispersed therein areas of nodular graphite. All of the carbon present is now in the form of graphite.

It is known that malleable iron with a low carbon content has greater strength than iron having a high carbon content. However, low carbon content malleable irons have greater liquid shrinkage. Foundries, therefore, seek an average, using a 2.40 to 2.60 per cent carbon content for air furnace malleable irons and a 3.00 to 3.25 per cent carbon content for cupola furnace irons.

The silicon content of a white iron to be annealed and rendered malleable must also be carefully guarded as silicon is a graphitizing agent and primary graphite will be deposited if the silicon content is carried too high. For 2.50 per cent carbon content about a 0.9 to 1.10% silicon content is ordinarily desirable.

However, because of its graphitizing properties a high silicon white iron is desirable in short anneal cycles since it speeds the breaking up of the free carbides in the first anneal stage. Ordinarily, when working with usual white iron, speeding up the first anneal stage causes the deposition of films of carbides at the grain boundaries. These carbide films are hard to break down and subsequently slow up the anneal cycle. The reason the carbide films remain intact is no doubt due to the fact that they are isolated at the grain boundaries and contain no nuclei on which to form the requisite nodules of carbon present in the annealed iron.

Oxides and sulphides present in the metal serve as nuclei for the formation of graphite nodules. To produce a uniform product therefore, the oxides must be evenly distributed throughout the mass. According to some authorities, carbon dioxide and carbon monoxide act as catalyzers to start graphitization in the anneal treatment. When graphitization is once started, as pointed out above, the carbon migrates through the metal and precipitates on the nuclei eventually forming the graphite nodules characteristic of malleable iron. While our superheat treatment is effective in a strict reducing zone and the metal is deoxidized rather than oxidized, it should be noted that it is impossible to completely deoxidize the iron in commercial operations because of the formation of an iron-iron oxide eutectoid.

By our method of superheating and agitating a white iron melt in a reducing atmosphere, the carbides present are well dispersed when the iron is cast. Since, in the anneal treatment, these carbides break down first, the minute graphite nuclei thus formed are likewise well dispersed. The well dispersed graphite nuclei prevent segregation of the difficultly decomposed carbide films at the grain boundaries and as a result, a high silicon white iron may be used and the first anneal stage greatly speeded up. Since the carbide films are not formed, the anneal time heretofore required to break them down is also eliminated.

In the second stage of annealing, which causes decomposition of the eutectoid Cementite, the carbon or graphite thus formed does not have a great distance to travel to find a nucleus because of the well dispersed graphite nuclei formed in the first step. As a result the second anneal stage may also be quickly completed.

As pointed out above, some authorities consider the presence of carbon dioxide and carbon monoxide to act as catalysts for the graphitization in annealing processes. Since our agitating and superheating treatment under reducing conditions serve to saturate the melt with the maximum volumes of carbon monoxide and carbon dioxide that can be held in solution, the presence of these gases, if they act as catalysts, also greatly speeds up the anneal treatment.

From the above description it is apparent that the superheat and agitating treatments in a reducing atmosphere produce a white iron having inherent characteristics that make it possible to be thoroughly annealed within a very short time. By preparing a white iron which can be thoroughly annealed in a few hours' time as contrasted with the white iron heretofore prepared which required anywhere from 35 to 150 hours of heat treatment to become annealed, we have made a valuable contribution to the prior art. Furthermore, the thorough dispersion of any oxides or sulphides that may be present in the iron, and the complete dissolution of carbon in the iron, plus the substantial absence of oxides, render white iron prepared by our process of extreme value in the preparation of malleable iron and the like by graphitization.

The following specific examples are given as typical in the preparation of white iron according to our invention. Annealing treatments of the white iron produced are also given to illustrate the inherent characteristics of the white iron. It should be understood, however, that we do not propose to limit ourselves to any of the specific reacting proportions or time limitations given since our invention is of a broad nature. Any type of anneal treatment with air, water or oil quenching may be used.

*Example 1*

A rocking type of indirect electric arc furnace which can be completely closed to prevent contact of the contents with the air (such as, for example, the Detroit rocking electric furnace) is charged with 400 pounds of steel scrap containing a negligible amount of silicon and carbon and about 0.3 to 0.6% manganese. To this steel scrap charge are added 12 pounds of crushed petroleum coke and 6.4 pounds of 50% ferro silicon alloy. The charge is melted and superheated to 2900° F. under reducing conditions maintained by closing the furnace. The molten mass is held at this temperature for about 5 minutes. An additional 6.4 pounds of 50% ferro silicon alloy are now added, and the furnace again tightly closed. The furnace is now rocked for about 5 to 10 minutes while maintaining a superheating temperature of 2900° F. The molten mass is then poured to give a white iron having the following composition:

| | Per cent |
|---|---|
| Carbon | 2.30 |
| Silicon | 1.60 |
| Manganese | 0.40 |

The white iron casting may now be annealed in an open air furnace at 1750° F. for 3 hours. The castings are then cooled in the furnace very gradually over a period of one hour to 1350° F. The castings are then air quenched. The resulting malleable iron has the following physical characteristics:

Pounds per square inch ultimate tensile strength _____ 52,300
Pounds per square inch yield point _____ 38,600
Elongation _____ 15%
Reduction in area _____ 16%

The white iron castings produced in Example 1 may also be annealed according to the following process: The castings are heated in an open air furnace at 1650° F. for 5 hours. They are next cooled at the rate of 75° F. per hour to 1300° F. and air quenched from 1300° F. This treatment gives malleable iron of the following physical properties:

Pounds per square inch ultimate tensile strength _____ 55,000
Elongation _____ 12 to 15%

*Example 2*

The rocking type of indirect electric arc furnace such as is used in Example 1 is charged with 1000 pounds of pig iron of the following composition:

|  | Per cent |
|---|---|
| Carbon | 4.20 |
| Silicon | 2.0 |
| Manganese | 0.65 | and the other metalloids usually present in pig iron.

After the iron is melted about 750 lbs. of steel scrap is gradually added. The furnace is then tightly closed and the molten mass is superheated to 2900° F. and held at this temperature for about five minutes. The furnace is simultaneously rocked during the superheat treatment. At the end of this treatment a white iron melt of 2.40% carbon and 1.14% silicon results.

12.6 pounds of 50% ferro silicon alloy are now added to the melt to bring the silicon content up to about 1.5%. The manganese content of the melt is about 0.54%.

While a temperature of 2900° F. is specified for the superheat treatment, it should be understood that any temperature between 2800° F. and 3100° F. may be used.

Castings made from the white iron so obtained may be annealed according to either of the annealing processes given above.

If desired, the white iron melt produced under reducing conditions according to either of the above examples may be graphitized as described in our copending application Serial No. 480,618 to produce a superior type of gray cast iron.

From the above description, it is apparent that our novel process for the preparation of superior grades of white iron makes it possible to produce malleable iron of high tensile strength and of relatively high elongations from said white iron by a short anneal process. While the annealing time depends upon the size of the casting, white iron castings produced according to our process of a heavy nature are annealed in considerably less time than was heretofore necessary for much smaller castings. Thus, couplers for railroad cars can be thoroughly annealed if cast from a white iron melt prepared according to our process by a heat treatment ranging from 5 to 8 hours, whereas prior art white iron when cast into railroad couplers was annealed only after heat treatment of prolonged duration.

We are aware that numerous details of the process may be varied through a wide range without departing from the principles of this invention, and we, therefore, do not propose limiting the patent granted hereon otherwise than necessitated by the prior art.

We claim as our invention:

1. A process of producing a thoroughly annealed iron in a short time which comprises superheating in a reducing atmosphere a white iron melt at a temperature of about 2900° F. for about 5 to 10 minutes while simultaneously agitating the melt, casting the improved white iron formed, heating the casting to about 1750° F. for 3 hours and gradually cooling the heated casting below the critical temperature.

2. The process of producing a short anneal thoroughly malleabilized iron from a white iron, which comprises superheating by means of the radiant heat of an electric arc a white iron melt to temperatures between 2800 to 3100° F. under reducing conditions while simultaneously agitating said melt, pouring the improved white iron formed, cooling below the critical point and heating the cooled iron to 1770° F. for five hours, cooling at the rate of 75° F. per hour to 1300° F. and quenching from 1300° F.

EDWIN L. CROSBY.
ALBERT E. RHOADS.